United States Patent [19]

Sugimoto et al.

[11] Patent Number: 5,429,846
[45] Date of Patent: Jul. 4, 1995

[54] PHOTO-SETTING CONDUCTIVE COATING COMPOSITION

[75] Inventors: Toshiya Sugimoto, Osaka; Minoru Suezaki; Kouji Maruyama, both of Ibaraki, all of Japan

[73] Assignee: Sekisui Chemical Co., Ltd., Osaka, Japan

[21] Appl. No.: 256,737

[22] PCT Filed: Dec. 1, 1993

[86] PCT No.: PCT/JP93/01749
§ 371 Date: Oct. 25, 1994
§ 102(e) Date: Oct. 25, 1994

[87] PCT Pub. No.: WO94/13745
PCT Pub. Date: Jun. 23, 1994

[30] Foreign Application Priority Data

Apr. 12, 1992 [JP] Japan .................. 4-325225

[51] Int. Cl.$^6$ .................. C09D 5/24; C09D 133/04; C09D 159/00; H01B 1/22
[52] U.S. Cl. .................. 428/34.4; 428/34.6; 428/34.7; 428/697; 428/702; 522/79; 522/74; 522/80; 522/81; 522/82; 522/83; 522/32; 522/40; 522/46; 522/48; 522/55; 522/56; 522/60; 522/62; 522/63; 522/65; 522/67; 522/68; 523/169; 524/431
[58] Field of Search .................. 522/87, 74, 79, 80, 522/82, 83, 32, 40, 46, 48, 55, 56, 60, 62, 63, 65, 67, 68; 523/169; 524/431; 428/34.4, 34.6, 34.7, 697, 702

[56] References Cited

U.S. PATENT DOCUMENTS

| | | |
|---|---|---|
| 4,959,178 | 9/1990 | Frentzel et al. ............... 522/81 |
| 4,999,136 | 3/1991 | Su et al. ....................... 428/901 |
| 5,045,235 | 9/1991 | Ohara et al. ................. 428/697 |
| 5,075,171 | 12/1991 | Kondo et al. ................ 428/696 |
| 5,256,484 | 10/1993 | Sato et al. ................... 428/426 |

FOREIGN PATENT DOCUMENTS

| | | |
|---|---|---|
| 0245675 | 5/1985 | Japan . |
| 1103906 | 5/1986 | Japan .................. 522/81 |
| 2-113075 | 4/1990 | Japan .................. 522/81 |
| 4-139267 | 5/1992 | Japan . |

*Primary Examiner*—Susan W. Berman
*Attorney, Agent, or Firm*—Nikaido, Marmelstein, Murray & Oram

[57] ABSTRACT

The present invention provides a photo-setting conductive coating composition which is used as an antistatic material constituting articles wherein static electrification must be avoided, such as storage vessels for semiconductor wafers, electronic/electric parts, floor/wall coverings for a production factory of semi-conductors, etc.

The photo-setting conductive coating composition comprising 100 parts by weight of an antimony oxide-containing tin oxide powder (a) having a particle size of 0.01 to 0.4 μm, 10 to 100 parts by weight of a (meth)acrylate compound (b) having at least two (meth)acryloyl groups in a molecule, 10 to 100 parts by weight of an acetal resin (c) having a residual hydroxyl group of 20 to 80 molar %, 0.1 to 10 parts by weight of a photopolymerization initiator (d) and 100 to 1000 parts by weight of an organic solvent (e).

19 Claims, No Drawings

PHOTO-SETTING CONDUCTIVE COATING COMPOSITION

TECHNICAL FIELD

The present invention relates to a photo-setting conductive coating composition which can be easily set by ultraviolet or active irradiation to form a coating film superior in conductivity, transparency, marring resistance and hardness.

BACKGROUND OF THE INVENTION

Heretofore, materials having antistatic properties have been used for storage vessels for semi-conductor wafers, electronic/electric parts, floor/wall coverings for a production factory of semi-conductors, etc., wherein static electrification must be avoided.

In order to impart antistatic properties to a molded article of a synthetic resin, for example, there can be normally used a method of coating a molded article with a paint containing a carbon powder, metallic powder, etc., or a method of molding a molded article using a synthetic resin kneaded with a carbon powder, carbon fiber, metallic fiber, etc.

However, the above methods have a problem that a transparent molded article can not be obtained due to the paint and coloring of the molded article itself, and the content can not be seen through the molded article in case of application for the window part.

In order to solve the above problems, various trials have been made. For example, Japanese Laid-Open Patent Publication No. 57-85866 discloses a transparent paint comprising a conductive fine powder of tin oxide as a main component and a binder.

The above paint can forms a coating film which is transparent and has antistatic properties, however, the resulting coating film normally has low hardness because the binder is a thermoplastic resin, thereby, a coating film having excellent marring resistance and solvent resistance can not be obtained.

Further, Japanese Laid-Open Patent Publication No. 60-60166 discloses a transparent paint comprising a conductive fine powder of tin oxide as a main component and a photo-setting resin binder.

The coating film formed by using this paint is superior in marring resistance and solvent resistance, however, storage stability of the paint is liable to be affected by a temperature, humidity, etc., which results in deterioration of transparency with time. Further, the paint has a problem about process, that is, sag is arisen during coating by a normal bar coating method, doctor blade coating method, roll coating method and dipping method because of it's low viscosity. There is also a problem that productivity such as raw material efficiency is inferior and nonuniformity is arisen on the surface of the coating film during coating by a spraying method suitable for a low viscosity paint.

In order to solve such a problem about storage, Japanese Laid-Open Patent Publication No. 62-161870 discloses a technique comprising formulating a metallic chloride into a paint comprising a conductive fine powder of a tin oxide as a main component and a binder resin to improve storage stability.

However, the above paint has a problem that the production environment is contaminated with metallic ion, halogen ion or hydrochloric acid produced by hydrolysis of metallic chloride because the metallic chloride is present in the coating film.

Under these circumstances, in order to solve the above problems, the present inventors have intensively studied. As a result, the present invention has been accomplished.

The main object of the present invention is to provide a photo-setting conductive coating composition which can be easily coated by a normal coating method, and can be easily set by ultraviolet or visible radiation. to form a coating film superior in antistatic properties, transparency, hardness and marring resistance.

This object as well as other objects and advantages of the present invention will become apparent to those skilled in the art from the following description.

DISCLOSURE OF THE INVENTION

According to the first embodiment of the present invention, there is provided a photo-setting conductive coating composition comprising 100 parts by weight of an antimony oxide-containing tin oxide powder (a) having a particle size of 0.01 to 0.4 $\mu$m, 10 to 100 parts by weight of a (meth)acrylate compound (b) having at least two (meth)acryloyl groups in a molecule, 10 to 100 parts by weight of an acetal resin (c) having a residual hydroxyl group of 20 to 80 molar %, 0.1 to 10 parts by weight of a photopolymerization initiator (d) and 100 to 1000 parts by weight of an organic solvent (e).

According to the second embodiment of the present invention, there is provided a photo-setting conductive coating composition comprising 100 parts by weight of an antimony oxide-containing tin oxide powder (a) having a particle size of 0.01 to 0.4 $\mu$m, 10 to 100 parts by weight of a (meth)acrylate compound (b) having at least two (meth)acryloyl groups in a molecule, 5 to 50 parts by weight of an acetal resin (c) having a residual hydroxyl group of 20 to 80 molar %, 0.1 to 10 parts by weight of a photopolymerization initiator (d), 100 to 1000 parts by weight of an organic solvent (e) and 0.1 to 50 parts by weight of an organic acid (f) selected from the group consisting of an aliphatic saturated monocarboxylic acid, a sulfonic acid derivative and an acid having a (meth)acryloyl group in a molecule.

According to the third embodiment of the present invention, there is provided a photo-setting conductive coating composition comprising 100 parts by weight of an antimony oxide-containing tin oxide powder (a) having a particle size of 0.01 to 0.4 $\mu$m, 10 to 100 parts by weight of a (meth)acrylate compound (b) having at least two (meth)acryloyl groups in a molecule, 0.1 to 10 parts by weight of a photopolymerization initiator (d), 100 to 1000 parts by weight of an organic solvent (e), 0.1 to 50 parts by weight of at least one sort of an organic acid (f) selected from the group consisting of an aliphatic saturated monocarboxylic acid, a sulfonic acid derivative and an acid having a (meth)acryloyl group in a molecule and 5 to 50 parts by weight of an acetal resin (g) having a (meth)acryloyl group at a side chain.

In the first embodiment of the present invention, the tin oxide powder (a) contains antimony oxide, and the amount is preferably 0.1 to 20% by weight. When the amount is too large or too small, conductivity of the coating film is deteriorated.

The particle size of the tin oxide powder (a) is limited within a range of 0.01 to 0.4 $\mu$m. When the particle size is too small, conductivity of the resulting coating film is deteriorated. On the other hand, when it is too large, visible radiation is scattered, which results in deterioration of transparency of the coating film.

The (meth)acrylate compound (b) used in the present invention has at least two (meth)acryloyl groups in a molecule, and examples thereof include bifunctional (meth)acrylates such as ethylene glycol di(meth)acrylate, diethylene glycol di(meth)acrylate, triethylene glycol di(meth)acrylate, tetraethylene glycol di(meth)acrylate, nonaethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, 2,2-bis[4-(acryloxydiethoxy)phenyl]propane, 2,2-bis[4-(methacryloxydiethoxy)phenyl]propane, 1,6-bis(3-acryloxy-2-hydroxypropyl)hexyl ether, etc.; trifunctional (meth)acrylates such as pentaerythritol tri(meth)acrylate, trimethylolpropane tri(meth)acrylate, glycerol tri(meth)acrylate, tris(2-hydroxyethyl)isocyanurate (meth)acrylate, etc.; tetra (or more) functional (meth)acrylates such as pentaerythritol tetra(meth)acrylate, pentaerythritol penta(meth)acrylate, dipentaerythritol penta(meth)acrylate, dipentaerythritol hexa(meth)acrylate, oligoester acrylate (polyester acrylate having about 5 to 6 acryloyl groups, e.g. "Alonix M-9050", manufactured by Toagosei Chemical Industry Co., Ltd.), etc.

Examples of the (meth)acrylate compound (b) other than those described above include an acrylic urethane oligomer having at least two (meth)acryloyl groups at a molecular terminal and an urethane bond in a molecule (e.g. urethane acrylate "UA-306T", "UA-3061", etc. manufactured by Kyoei Sha Chemical Co.). When using the acrylic urethane oligomer, hardness and marring resistance of the resulting coating film is further improved.

For example, the acrylic urethane oligomer is prepared by reacting a compound having at least two isocyanate groups in a molecule with (meth)acrylate having an active hydrogen.

Examples of the compound having at least two isocyanate groups in a molecule include m-phenylene diisocyanate, p-phenylene diisocyanate, toluene-2,4-diisocyanate, toluene-2,5-diisocyanate, toluene-2,6-diisocyanate, toluene-3,5-diisocyanate, m-xylylene diisocyanate, p-xylylene diisocyanate, hexamethylene diisocyanate, trimethylhexamethylene diisocyanate, isophorone diisocyanate, 4,4'-diphenylmethane diisocyanate, 4,4'-diisocyanate-3,3'-dimethylbiphenyl, 4,4'-diisocyanate-3,3'-dimethylbiphenylmethane and the like.

Examples of the (meth)acrylate having an active hydrogen include 2-hydroxyethyl (meth)acrylate, 2-hydroxypropyl (meth)acrylate, 3-hydroxypropyl (meth)acrylate, glycerin di(meth)acrylate, 1,6-bis(3-acryloxy-2-hydroxypropyl)hexyl ether, pentaerythritol tri(meth)acrylate, tris-(2-hydroxyethyl)isocyanurate (meth)acrylate, (meth)acrylic acid and the like.

The (meth)acrylate compound (b) may be used alone or in combination. In case of use in combination, it is preferred to formulate the (meth)acrylic urethane oligomer. The amount of the (meth)acrylic urethane oligomer is preferably 10 to 90% by weight. When the amount is too large or small, marring resistance of the resulting coating film is deteriorated.

In the photo-setting conductive coating composition of the present invention, when the amount of the (meth)acrylate compound (b) is too small, mechanical strength of the coating film is lowered. On the other hand, when the amount is too large, dispersion properties of the tin oxide powder (a) becomes inferior, which results in deterioration of transparency of the coating film. Therefore, the amount of the (meth)acrylate compound (b) is limited within a range of 10 to 100 parts by weight, preferably 20 to 60 parts by weight, based on 100 parts by weight of the tin oxide powder (a).

The acetal resin (c) used in the present invention is mainly composed of a portion in which an acetal group is bonded to an ethylene group constituting a main chain, and a portion in which a hydroxyl group is bonded to the ethylene group. The acetalization degree is preferably 10 to 80 molar %.

In the acetal resin (c), when the molar % of the residual hydroxyl group [the molar % of the ethylene group to which the hydroxyl group is bonded, for the total ethylene groups (derived from a vinyl group of a raw monomer) constituting the main chain] is too small, capability of dispersing the tin oxide powder (a) becomes insufficient, which results in deterioration of transparency. When it is too large, viscosity of the coating composition is lowered, which results in deterioration of coating performance. Therefore, the molar% of the residual hydroxyl group is limited within a range of 20 to 80 molar %.

The acetal resin (c) is prepared by subjecting polyvinyl alcohol and aldehyde to a condensation reaction to acetalize. In order to conduct acetalization, there can be used a known method, e.g. a precipitation method of using an aqueous medium in the presence of an acid catalyst and a method of using a solvent such as alcohol, etc.

Further, the polyvinyl acetal resin can also be obtained by conducting saponification and acetalization at the same time, using polyvinyl acetate as a raw material.

When the average polymerization degree of the polyvinyl alcohol is too small, viscosity of the coating composition of the present invention becomes low, which results in deterioration of coating performance. Therefore, it is preferred that the average polymerization degree is not less than 200.

Examples of the aldehyde include formaldehyde, acetaldehyde, propionaldehyde, butyraldehyde, amylaldehyde, hexylaldehyde, heptylaldehyde, octylaldehyde, 2-ethylhexylaldehyde, decylaldehyde, cyclohexylaldehyde and the like.

The aldehyde may be used alone or in combination.

Further, the acetal resin (c) may be those in which an acetyl group remains in a hydroxyl group. The molar % of the residual acetyl group [the molar % of the ethylene Group to which the acetoxy group is bonded, for the total ethylene groups (derived from a vinyl group of a raw monomer) constituting the main chain] is preferably not more than 10 molar %.

The acetalization degree, molar % of the residual hydroxyl group and molar % of the residual acetyl group of the acetal resin (c) are measured, for example, by NMR method according to a normal manner.

In the photo-setting conductive coating composition of the present invention, when the amount of the acetal resin (c) is too small, dispersion properties of the tin oxide powder (a) becomes inferior, which results in deterioration of transparency. Further, no thickening effect is obtained, which results in deterioration of coating performance. On the other hand, when the amount of the acetal resin (c) is too large, hardness and marring resistance of the coating film becomes inferior. Therefore, the amount of the acetal resin (c) is limited within a range of 10 to 100 parts by weight, preferably 10 to 30 parts by weight, based on 100 parts by weight of the tin oxide powder (a).

The photopolymerization initiator (d) used in the present invention may be those which have properties of initiating polymerization by active radiations such as ultraviolet or visible radiation.

Among photopolymerization initiators (d), examples of those activated by ultraviolet radiation include sulfides such as sodium methyldithiocarbamate sulfide, tetramethylthiuram monosulfide, diphenyl monosulfide, dibenzothiazoyl monosulfide, disulfide, etc.; thioxanthones such as thioxanthone, 2-ethylthioxanthone, 2-chlorothioxanthone, 2,4-diethylthioxanthone, etc.; (di)azo compounds such as hydrazone, azobisisobutyronitrile, benzenediazonium, etc.; aromatic carbonyl compounds such as benzoin, benzoin methyl ether, benzoin ethyl ether, benzophenone, dimethylaminobenzophenone, dimethylaminoacetophenone, Michler's ketone, benzylanthraquinone, t-butylanthraquinone, 2-methylanthraquinone, 2-ethylanthraquinone, 2-aminoanthraquinone, 2-chloroanthraquinone, benzyl dimethyl ketal, methylphenyl glyoxylate, etc.; dialkylaminobenzoates such as methyl-p-dimethylaminobenzoate, ethyl-p-dimethylaminobenzoate, butyl-p-dimethylaminobenzoate isopropyl-p-diethylaminobenzoate, etc.; peroxides such as benzoyl peroxide, di-t-butyl peroxide, dicumyl peroxide, cumene hydroperoxide, etc.; acridines such as 9-phenylacridine, 9-p-methyoxyphenylacridine, 9-acetylaminoacridine, benzacridine, etc.; phenazines such as 9,10-dimethylbenzphenazine, 9-methylbenzphenazine, 10-methoxybenzphenazine, etc.; quinoxalines such as 6,4',4''-trimethoxy-2,3-diphenylquinoxaline, etc.; 2,4,5-triphenylimidazoyl dimer, etc.

Examples of those activated by visible radiation include 2-nitrofluorene, 2,4,6-triphenylpyrylium tetrafluoroborate, 2,4,6-tris(trichloromethyl)-1,3,5-triazine, 3,3'-carbonylbiscumarin, Michler's thioketone and the like.

The tin oxide powder (a) strongly absorbs ultraviolet radiation having a wavelength of 350 nm or less, and the degree of coloring becomes large in case of ultraviolet radiation having a wavelength of 400 nm or more. Therefore, the photopolymerization initiator (d) having a maximum absorption wavelength within a range of 350 to 400 nm is preferred in the present invention.

In the photo-setting coating composition of the present invention, when the amount of the photopolymerization initiator (d) is too small, the polymerization reaction does not proceed so that hardness and marring resistance of the resulting coating film becomes insufficient.

Further, even if the amount of the photopolymerization initiator (d) is larger than the predetermined amount, thickening effect is scarcely obtained. In addition, the coating film is set only at the surface thereof and complete setting can not be obtained. Therefore, the amount of the photopolymerization initiator (d) is limited within a range of 0.1 to 10 parts by weight based on 100 parts by weight of the tin oxide powder (a).

The organic solvent (e) is not specifically limited, but those which dissolve the acetal resin (c) are preferred. In case of solvents having a low boiling point or high volatility, viscosity of the coating composition varies due to evaporation during coating. In case of solvents having high boiling point, a long period of time is required for the drying process. Therefore, the boiling point is preferably 80° to 160° C.

The organic solvent (e) may be preferably those having oxygen so as to enhance affinity with the tin oxide powder (a), and examples thereof include cyclohexane, ethylene glycol monomethyl ether (methyl cellosolve), ethylene glycol monoethyl ether (cellosolve), diethylene glycol dimethyl ether, butyl acetate, isopropyl acetone, methyl ethyl ketone, anisole and the like. The organic solvent (e) may be used alone or in combination.

In the coating composition of the present invention, when the amount of the organic solvent (e) is too small, viscosity is increased, which results in deterioration of coating performance. At the same time, dispersion properties of the tin oxide powder (a) becomes inferior, which results in deterioration of antistatic properties of the coating film. On the other hand, when the amount is too large, viscosity is lowered to cause sag phenomenon. Therefore, the amount of the organic solvent (e) is limited within a range of 100 to 1000 parts by weight based on 100 parts by weight of the tin oxide powder (a).

In the photo-setting conductive coating composition of the second embodiment of the present invention, the organic acid (f) is added to the coating composition of the first embodiment.

The organic acid (f) is at least one sort selected from the group consisting of an aliphatic saturated monocarboxylic acid, a sulfonic acid derivative and an acid having a (meth)acryloyl group in a molecule.

Examples of the aliphatic saturated monocarboxylic acid include acetic acid, propionic acid and butyric acid. Examples of the sulfonic acid derivative include alkylsulfonic acids such as methanesulfonic acid, ethanesulfonic acid, etc.; those having a sulfonic group such as p-styrenesulfonic acid, 2-(meth)acrylamide-2-methylpropanesulfonic acid, etc.

When the boiling point of the aliphatic unsaturated monocarboxylic acid or sulfonic acid derivative is too low, the solvent is liable to be evaporated from the coating composition to increase viscosity. When the boiling point is too high, it becomes difficult to completely remove the solvent upon drying. Therefore, the boiling point is preferably 60° to 180° C.

In the photo-setting conductive coating composition of the second embodiment of the present invention, when the amount of the aliphatic saturated monocarboxylic acid or sulfonic acid derivative is too small, effect of preventing thixotropic properties becomes insufficient. On the other hand, when the amount is too large, it takes a long period of time to remove the solvent. Further, the working environment becomes inferior due to odor development. Therefore, the amount is limited within a range of 0.1 to 50 parts by weight based on 100 parts by weight of the tin oxide powder (a).

Examples of the acid having a (meth)acryloyl group in a molecule include those having a carboxyl group such as (meth)acrylic acid, 2-(meth)acryloyloxyethylsuccinic acid, 2-(meth)acryloyloxyethylphthalic acid, 2-(meth)acryloyloxyethyl-2-hydroxyethylsuccinic acid, 2-(meth)acryloyloxyethyl-2-hydroxyethylphthalic acid, etc.; those having a phosphoric group such as mono [2-(meth)acryloyloxyethyl]acid phosphate and bis [2-(meth)acryloyloxyethyl]acid phosphate, mono [2-(meth)acryloyloxypropyl]acid phosphate, etc.

Further, the acid having a (meth)acryloyl group in a molecule is incorporated into the molecule by the unsaturated group which is present in the same molecule in case of the cross-linking reaction of the coating composition. Therefore, no acid is exuded from the coating film after setting and the production environment is not contaminated.

In the photo-setting conductive coating composition of the second embodiment of the present invention, when the amount of the acid having a (meth)acryloyl group in a molecule is too small, storage stability becomes inferior. On the other hand, when the amount is too large, cross-link density of the coating film after setting is lowered, which results in deterioration of hardness, marring resistance and chemical resistance. Therefore, the amount is limited within a range of 0.1 to 50 parts by weight, preferably 0.1 to 30 parts by weight, based on 100 parts by weight of the tin oxide powder (a).

In the photo-setting conductive coating composition of the third embodiment of the present invention, the acetal resin (g) having a (meth)acryloyl group at a side chain is used in place of the acetal resin (c) in the coating composition of the second embodiment.

The acetal resin (g) used in the third embodiment of the present invention is that in which a side chain having a (meth)acryloyl group is introduced into the acetal resin (c), for example, it can be obtained by reacting a hydroxyl group of the acetal resin (c) with an isocyanate compound having a (meth)acryloyl group.

In the acetal resin (g), when the molar % of the residual hydroxyl group [the molar % of the ethylene group to which the hydroxyl group is bonded, for the total ethylene groups (derived from a vinyl group of a raw monomer) constituting the main chain] is too small, dispersion properties of the tin oxide powder (a) becomes insufficient. When it is too large, chemical resistance of the coating film is affected. Therefore, the molar % of the residual hydroxyl group is preferably 2 to 60 molar %, more preferably 5 to 40 molar %.

In the acetal resin (g), when the number of the (meth)acryloyl group is too small, cross-linking of the (meth)acrylate compound (b) becomes insufficient, which results in deterioration of chemical resistance of the coating film. When it is too large, solubility to the solvent becomes inferior. Therefore, the molar % of the (meth)acryloyl group [the molar % of the ethylene group to which the side chain having the (meth)acryloyl group is bonded, for the total ethylene groups (derived from a vinyl group of a raw monomer) constituting the main chain] is preferably 5 to 80 molar %, more preferably 10 to 60 molar %.

In the photo-setting conductive coating composition of the third embodiment, when the amount of the acetal resin (g) is too small, dispersion properties of the tin oxide powder (a) becomes inferior, which results in deterioration of transparency. Further, viscosity becomes low, which results in deterioration of coating performance. Therefore, the amount of the acetal resin (g) is limited within a range of 5 to 50 parts by weight, preferably 7 to 30 parts by weight, based on 100 parts by weight of the tin oxide powder (a).

The constitution of the photo-setting conductive coating composition of the present invention are as described above. If necessary, various additives such as UV absorbing agents, antioxidants, thermal polymerization inhibitors such as hydroquinone, surface modifiers, defoaming agent, etc. may be added.

In order to prevent deterioration of sensitivity of the photopolymerization initiator (d) due to oxygen inhibition, an amine compound may be added to the coating composition of the present invention.

The amine compound may be anyone which is nonvolatile, but is not limited to aliphatic amines, aromatic amines and the like.

The photo-setting conductive coating composition of the present invention can be obtained by adding the tin oxide powder (a) and the acetal resin (c) or the acetal resin (g) to the organic solvent (e), and after mixing them, adding the other components such as (meth)acrylate compound (b), photopolymerization initiator (d) and organic acid (f) to the resulting mixture, and then mixing them. In order to completely disperse the tin oxide powder (a) in the coating composition, a particular equipment is not required, for example, there can be used sand mill, ball mill, attritor, high-speed rotary agitator, three-roll mil and the like.

The coating film is formed by applying the photo-setting conductive coating composition of the present invention according to a normal coating method such as spraying method, bar coating method, doctor blade coating method, roll coating method, dipping method, etc. and then irradiating active radiations such as ultraviolet or visible radiation to set the coating film.

It is preferred that the resulting coating film may be surface-finished by buffing.

By surface finishing, transparency of the coating film is improved and, at the same time, the tin oxide powder which is present at the surface and is liable to be fallen out can be removed. This prevents dust from developing from the coating film upon use. The surface finishing by buffing is suitable for the production of the semiconductor in which dust must be markedly avoided.

As the objective article to which the above coating composition is applied, for example, there are film, sheet or cabinet of synthetic resins such as vinyl chloride resin, acrylic resin, ABS resin, polycarbonate, polyethylene terephthalate, etc., glass plate and the like.

The light source for setting the above coating composition may be anyone which has hitherto been known, but is not limited to high-pressure mercury vapor lamp, ultra high-pressure mercury vapor lamp, metal halide lamp and the like.

The photo-setting conductive coating composition of the present invention may be easily set by ultraviolet or visible radiation to form a coating film, and the resulting coating film is superior in conductivity, transparency, hardness and marring resistance.

The photo-setting conductive coating composition of the present invention can be applied by a normal coating method without causing any sag and, therefore, it is superior in productivity.

The photo-setting conductive coating composition of the second embodiment of the present invention can inhibits thixotropic properties by formulating a specific organic acid (f). Further, no change in viscosity is arisen during storage for a long period of time and a coating film having the smooth surface can be formed.

In case that an acid having a (meth)acryloyl group is used as the above organic acid (f), the acid is incorporated photosettingly into the cross-linked structure of the coating film. Therefore, no acid is exuded from the coating film and the working environment is not contaminated.

The photo-setting conductive coating composition of the third embodiment of the present invention forms a coating film having better physical properties in addition to the effect due to the second embodiment, by formulating a specific organic acid (f) and an additional specific acetal resin (g).

Accordingly, the photo-setting conductive coating composition of the present invention can be used for storage vessels for semi-conductor wafers, electronic/electric parts, floor/wall coverings for a production factory of semi-conductors etc., wherein static electrification must be avoided.

BEST MODE OF CARRYING OUT THE INVENTION

The following Examples and Comparative Examples further illustrate the present invention in detail but are not to be construed to limit the scope thereof. In the Examples and Comparative Examples, "parts" is by weight unless otherwise stated.

The method of the measurement of the acetalization degree of the polyvinyl acetal resin was conducted by NMR method. This will be explained as to the polyvinyl butyral resin, below.

A 2% deuterated chloroform solution of polyvinyl butyral resin was prepared, to which was added a small amount of tetramethylsilane [(CH$_3$)$_4$Si] as a standard substance. Then, the spectral measurement was conducted at 23° C. According to the resulting measured chart, each value of an integral intensity ($I_A$ and $I_B$) from the following attribution and integral intensity of each absorption peak was inserted into the following calculation formula to determine a butyralation degree.

| Chemical shift (ppm) | Attribution | Integral intensity |
|---|---|---|
| 0.8 to 0.9 | CH$_3$ at butyl group terminal | $I_A$ |
| 1.0 to 1.9 | CH$_2$ in main chain and butyl group | $I_B$ |

<Calculation formula>
The butyralation degree = $\{2I_A/(3I_B - 4I_A)\} \times 100$ (molar %)

EXAMPLE 1

[Preparation of photo-setting conductive coating composition]

100 Parts of an antimony oxide-containing tin oxide powder having a particle size of 0.02 μm ("T-1", manufactured by Mitsubishi Material Co., Ltd.), 17 parts of an acetal resin (a butyralization degree: 40 molar %; an acetoacetalization degree: 27 molar %; a residual hydroxyl group: 32 molar %; a residual acetyl group: 1 molar %; a polymerization degree: 2000), 27 parts of pentaerythritol tetraacrylate, 0.1 parts of hydroquinone and 380 parts of cellosolve were charged in an attritor which was run for 10 hours to disperse each component.

Then, a solution prepared by dissolving 1 part of thioxanthone and 1 part of dimethylaminoacetophenone in 50 parts of cellosolve was added and the attritor was run for additional 15 minutes to give a photo-setting conductive coating composition. [Formation of coating film]

The above coating composition was applied on a transparent acrylic resin plate (thickness: 5 mm) using a bar coater so that a dry film thickness becomes 2 μm, followed by drying at normal temperatures for 30 minutes and further hot-air drying at 50° C. for 10 minutes.

Then, ultraviolet radiation from a high-pressure mercury vapor lamp was irradiated at an irradiation dose of 1800 J/cm$^2$ to form a set coating film. The surface of the resulting coating film was finished by buffing with a wool polishing cloth of 30 cm in diameter (3000 rpm). [Measurement of physical properties of photo-setting conductive coating composition and coating film]

Regarding the above coating composition and the coating film (thickness: 2 μm) obtained from the coating composition, the following measurement of physical properties was conducted, respectively. The results are shown in Table 1, below.

(1) Viscosity of the photo-setting conductive coating composition: It was measured by using a B type viscometer.

(2) Surface intrinsic resistance of the coating film: It was measured according to ASTM D257.

(3) Total light transmittance and haze of the coating film: It was measured according to ASTM D1003.

(4) Pencil hardness of the coating film: It was measured according to JIS K5400.

EXAMPLE 2

According to the same manner as that described in Example 1 except for using 16 parts of an acetal resin (a butyralization degree: 38 molar %; an acetoacetalization degree: 29 molar %; a residual hydroxyl group: 32 molar %; a residual acetyl group: 1 molar %; a polymerization degree: 2400) as the acetal resin, a photo-setting conductive coating composition was obtained.

According to the same manner as that described in Example 1, physical properties of the coating composition and the coating film formed from the coating composition according to the same manner as that described in Example 1 were measured. The results are shown in Table 1.

EXAMPLE 3

100 Parts of an antimony oxide-containing tin oxide powder having a particle size of 0.02 μm ("T-1", manufactured by Mitsubishi Material Co., Ltd.), 16 parts of an acetal resin (an acetoacetalization degree: 65 molar %; a residual hydroxyl group: 34 molar %; a residual acetyl group: 1 molar %; a polymerization degree: 2400), 28 parts of oligoester acrylate ("M-9050", manufactured by Toagosei Chemical Industry Co., Ltd), 0.1 part of hydroquinone and 380 parts of cellosolve were charged in an attritor which was run for 10 hours to disperse each component.

Then, a solution prepared by dissolving 1 part of thioxanthone and 1 part of ethyl-p-dimethylaminobenzoate in 50 parts of cellosolve was added and the attritor was run for additional 15 minutes to give a photo-setting conductive coating composition.

According to the same manner as that described in Example 1, physical properties of the coating composition and the coating film formed from the coating composition according to the same manner as that described in Example 1 were measured. The results are shown in Table 1.

EXAMPLE 4

According to the same manner as that described in Example 3 except for using 25 parts of an acetal resin (a butyralization degree: 45 molar %; a residual hydroxyl group: 50 molar %; a residual acetyl group: 5 molar %; a polymerization degree: 1500) as the acetal resin, a photo-setting conductive coating composition was obtained.

According to the same manner as that described in Example 1, physical properties of the coating composition and the coating film formed from the coating composition according to the same manner as that described in Example 1 were measured. The results are shown in Table 1.

EXAMPLE 5

According to the same manner as that described in Example 3 except for using 16 parts of an acetal resin (a butyralization degree: 30 molar %; a residual hydroxyl group: 69 molar %; a residual acetyl group: 1 molar %; a polymerization degree: 2400) as the acetal resin, a photo-setting conductive coating composition was obtained.

According to the same manner as that described in Example 1, physical properties of the coating composition and the coating film formed from the coating composition according to the same manner as that described in Example 1 were measured. The results are shown in Table 1.

EXAMPLE 6

100 Parts of an antimony oxide-containing tin oxide powder having a particle size of 0.02 μm ("T-1", manufactured by Mitsubishi Material Co., Ltd.), 18 parts of an acetal resin (a butyralization degree: 65 molar %; a residual hydroxyl group: 34 molar %; a residual acetyl group: 1 molar %; a polymerization degree: 1700), 11 parts of pentaerythritol triacrylate, 18 parts of pentaerythritol tetraacrylate, 0.1 part of hydroquinone, 40 parts of methyl ethyl ketone and 370 parts of cellosolve were charged in an attritor which was run for 10 hours to disperse each component.

Then, a solution prepared by dissolving 1 part of benzophenone and 1 part of Michler's ketone in 50 parts of cellosolve was added and the attritor was run for additional 15 minutes to give a photo-setting conductive coating composition.

According to the same manner as that described in Example 1, physical properties of the coating composition and the coating film formed from the coating composition according to the same manner as that described in Example 1 were measured. The results are shown in Table 1.

EXAMPLE 7

100 Parts of an antimony oxide-containing tin oxide powder having a particle size of 0.02 μm ("T-1", manufactured by Mitsubishi Material Co., Ltd.), 13 parts of an acetal resin (a butyralization degree: 65 molar %; a residual hydroxyl group: 34 molar %; a residual acetyl group: 1 molar %; a polymerization degree: 1700), 10 parts of pentaerythritol triacrylate, 17 parts of pentaerythritol tetraacrylate, 0.1 part of hydroquinone, 40 parts of methyl ethyl ketone and 250 parts of cellosolve were charged in an attritor which was run for 10 hours to disperse each component.

Then, a solution prepared by dissolving 1 part of benzophenone and 1 part of Michler's ketone in 50 parts of cellosolve was added and the attritor was run for additional 15 minutes to give a photo-setting conductive coating composition.

According to the same manner as that described in Example 1, physical properties of the coating composition and the coating film formed from the coating composition according to the same manner as that described in Example 1 were measured. The results are shown in Table 1.

EXAMPLE 8

100 Parts of an antimony oxide-containing tin oxide powder having a particle size of 0.02 μm ("T-1", manufactured by Mitsubishi Material Co., Ltd.), 17 parts of an acetal resin (a butyralization degree: 65 molar %; a residual hydroxyl group: 34 molar %; a residual acetyl group: 1 molar %; a polymerization degree: 1700), 27 parts of pentaerythritol tetraacrylate, 0.1 parts of hydroquinone and 380 parts of cellosolve were charged in an attritor which was run for 10 hours to disperse each component.

Then, a solution prepared by dissolving 1 part of thioxanthone and 1 part of dimethylaminoacetophenone in 50 parts of cellosolve was added and the attritor was run for additional 15 minutes to give a photo-setting conductive coating composition.

According to the same manner as that described in Example 1, physical properties of the coating composition and the coating film formed from the coating composition according to the same manner as that described in Example 1 were measured. The results are shown in Table 1.

EXAMPLE 9

100 Parts of an antimony oxide-containing tin oxide powder having a particle size of 0.02 μm ("T-1", manufactured by Mitsubishi Material Co., Ltd.), 17 parts of an acetal resin (a butyralization degree: 65 molar %; a residual hydroxyl group: 34 molar %; a residual acetyl group: 1 molar %; a polymerization degree: 1700), 20 parts of pentaerythritol triacrylate, 7 parts of urethane acrylate ("UA-306T", manufactured by Kyoei Sha Chemical Co.), 0.1 parts of hydroquinone and 380 parts of cellosolve were charged in an attritor which was run for 10 hours to disperse each component.

Then, a solution prepared by dissolving 1 part of thioxanthone and 1 part of dimethylaminoacetophenone in 50 parts of cellosolve was added and the attritor was run for additional 15 minutes to give a photo-setting conductive coating composition.

According to the same manner as that described in Example 1, physical properties of the coating composition and the coating film formed from the coating composition according to the same manner as that described in Example 1 were measured. The results are shown in Table 1.

In addition to the above measurement, the marring resistance of the coating film was evaluated by the following method. The results are shown in Table 1.

(5) Marring resistance: It was evaluated by subjecting a coating film to Taber abrasion (100 cycles were repeated at a load of 500 g using a CS-10 truck wheel) and measuring the surface intrinsic resistance and haze of the coating film according to the method of the above items (2) and (3)

EXAMPLE 10

According to the same manner as that described in Example 9 except for substituting 10 parts of pentaerythritol triacrylate for 20 parts of pentaerythritol triacrylate and substituting 17 parts of urethane acrylate for 7 parts of urethane acrylate, a coating composition was obtained.

According to the same manner as that described in Example 9, physical properties of the coating composition and the coating film formed from the coating composition according to the same manner as that described

EXAMPLE 11

According to the same manner as that described in Example 9 except for substituting 20 parts of trimethylolpropane triacrylate for 20 parts of pentaerythritol triacrylate and substituting 20 parts of urethane acrylate ("UA-306I", manufactured by Kyoei Sha Chemical Co.) for 7 parts of urethane acrylate, and further substituting 1 part of benzophenone for 1 part of thioxanthone and subjecting 1 part of Michler's ketone for 1 part of dimethylaminoacetophenone, a coating composition was obtained.

According to the same manner as that described in Example 9, physical properties of the coating composition and the coating film formed from the coating composition according to the same manner as that described in Example 1 were measured. The results are shown in Table 1.

EXAMPLE 12

According to the same manner as that described in Example 9 except for substituting 10 parts of dipentaerythritol hexaacrylate for 20 parts of trimethylolpropane triacrylate in Example 11, a coating composition was obtained.

According to the same manner as that described in Example 9, physical properties of the coating composition and the coating film formed from the coating composition according to the same manner as that described in Example 1 were measured. The results are shown in Table 1.

Comparative Example 1

100 Parts of an antimony oxide-containing tin oxide powder having a particle size of 0.02 μm ("T-1", manufactured by Mitsubishi Material Co., Ltd.), 23 parts of a copolymer of hydroxyethyl methacrylate and methyl methacrylate (weight ratio: 2:8), 9 parts of pentaerythritol triacrylate, 15 parts of pentaerythritol tetraacrylate, 0.1 parts of hydroquinone, 220 parts of methyl ethyl ketone and 190 parts of cellosolve were charged in an attritor which was run for 10 hours to disperse each component.

Then, a solution prepared by dissolving 1 part of benzophenone and 1 part of Michler's ketone in 50 parts of cellosolve was added and the attritor was run for additional 15 minutes to give a photo-setting conductive coating composition.

According to the same manner as that described in Example 1, physical properties of the coating composition and the coating film formed from the coating composition according to the same manner as that described in Example 1 were measured. The results are shown in Table 1.

Comparative Example 2

100 Parts of an antimony oxide-containing tin oxide powder having a particle size of 0.02 μm ("T-1", manufactured by Mitsubishi Material Co., Ltd.), 40 parts of tetramethylolmethane tetraacrylate, 0.1 parts of hydroquinone and 380 parts of cellosolve were charged in an attritor which was run for 10 hours to disperse each component.

Then, a solution prepared by dissolving 1 part of thioxanthone and 1 part of dimethylaminoacetophenone in 50 parts of cellosolve was added and the attritor was run for additional 15 minutes to give a photo-setting conductive coating composition.

According to the same manner as that described in Example 1, physical properties of the coating composition and the coating film formed from the coating composition according to the same manner as that described in Example 1 were measured. The results are shown in Table 1.

TABLE 1

| | | | 1 | 2 | 3 | 4 | 5 | 6 | 7 | 8 | 9 | 10 | 11 | 12 | Comp. 1 | Comp. 2 |
|---|---|---|---|---|---|---|---|---|---|---|---|---|---|---|---|---|
| Viscosity of coating composition (centipoise) | | | 260 | 280 | 280 | 250 | 350 | 180 | 250 | 270 | 200 | 190 | 180 | 190 | 20 | 270 |
| Physical properties of coating composition | Surface intrinsic resistance ($10^6 \Omega/\square$) | Before Taber test | 1 | 1 | 1 | 1 | 1 | 3 | 1 | 2 | 2 | 2 | 800 | 2 | 800 | 2 |
| | | After Taber test | — | — | — | — | — | — | — | — | 8 | 7 | 4 | 6 | — | — |
| | Haze (%) | Before Taber test | 1.3 | 3.2 | 2.0 | 4.0 | 4.0 | 1.3 | 3.2 | 2.0 | 2.1 | 2.2 | 2.6 | 1.9 | 7.7 | 35 |
| | | After Taber test | — | — | — | — | — | — | — | — | 10.1 | 11.2 | 9.6 | 10.1 | — | — |
| | Total light transmittance (%) | | 83 | 80 | 82 | 80 | 81 | 83 | 80 | 82 | 82 | 84 | 84 | 83 | 85 | 75 |
| | Pencil hardness | | 5H | 5H | 5H | 5H | 5H | 5H | 5H | 5H | 5H | 5H | 5H | 5H | 4H | 5H |

EXAMPLE 13

To 100 parts of an antimony oxide-containing tin oxide powder having a particle size of 0.02 μm ("T-1", manufactured by Mitsubishi Material Co., Ltd.), 9 parts of an acetal resin (a butyralization degree: 65 molar %; a residual hydroxyl group: 34 molar %; a residual acetyl group: 1 molar %; a polymerization degree: 1700), 33 parts of dipentaerythritol hexaacrylate, 0.1 parts of hydroquinone, 250 parts of cellosolve, 1 part of 2,4-diethylthioxanthone and 1 part of dimethylaminoacetophenone, a solution prepared by dissolving 0.4 parts of 2-acrylamide-2-methylpropanesulfonic acid in 10 parts of methanol was added and the mixture was charged in an attritor which was run for 10 hours to disperse each component.

According to the same manner as that described in Example 1, physical properties of the coating composition and the coating film formed from the coating composition according to the same manner as that described in Example 1 were measured. The results are shown in Table 2.

Further, the coating composition was stored in a sealed vessel for one month and the viscosity thereof was measured by a B type viscometer. In addition, the same composition was applied on an acrylic plate using a bar coater and appearance thereof was visually observed. The results are shown Table 2, below.

Example 14

100 Parts of an antimony oxide-containing tin oxide powder having a particle size of 0.02 μm ("T-1", manufactured by Mitsubishi Material Co., Ltd.), 8 parts of an acetal resin (a butyralization degree: 65 molar %; a residual hydroxyl group: 34 molar %; a residual acetyl group: 1 molar %; a polymerization degree: 1700), 5 parts of pentaerythritol triacrylate, 12 parts of pentaerythritol tetraacrylate, 20 parts of 2-acryloyloxyethylsuccinic acid ("Alonix M-5500", manufactured by Toagosei Chemical Industry Co., Ltd), 0.1 parts of hydroquinone and 240 parts of cellosolve were charged in an attritor which was run for 10 hours to disperse each component.

Then, a solution prepared by dissolving 1 part of 2,4-diethylthioxanthone and 1 part of ethyl-p-dimethylaminobenzoate in 20 parts of cellosolve was added and the attritor was run for additional 15 minutes to give a photo-setting conductive coating composition.

According to the same manner as that described in Example 13, physical properties of the coating composition and the coating film formed from the coating composition according to the same manner as that described in Example 1 were measured. The results are shown in Table 2.

EXAMPLE 15

100 Parts of an antimony oxide-containing tin oxide powder having a particle size of 0.02 μm ("T-1", manufactured by Mitsubishi Material Co., Ltd.), 8 parts of an acetal resin (a butyralization degree: 65 molar %; a residual hydroxyl group: 34 molar %; a residual acetyl group: 1 molar %; a polymerization degree: 1700), 4 parts of pentaerythritol triacrylate, 14 parts of pentaerythritol tetraacrylate, 7 parts of mono(2-acryloyloxyethyl)acid phosphate, 0.1 parts of hydroquinone, 40 parts of methyl ethyl ketone and 240 parts of cellosolve were charged in an attritor which was run for 10 hours to disperse each component.

Then, a solution prepared by dissolving 1 part of 2,4-diethylthioxanthone and 1 part of ethyl-p-dimethylaminobenzoate in 20 parts of cellosolve was added and the attritor was run for additional 15 minutes to give a photo-setting conductive coating composition.

According to the same manner as that described in Example 13, physical properties of the coating composition and the coating film formed from the coating composition according to the same manner as that described in Example 1 were measured. The results are shown in Table 2.

EXAMPLE 16

To 100 parts of an antimony oxide-containing tin oxide powder having a particle size of 0.02 μm ("T-1", manufactured by Mitsubishi Material Co., Ltd.), 10 parts of an acetal resin (a butyralization degree: 38 molar %; an acetoacetalization degree: 29 molar %, a residual hydroxyl group: 32 molar %; a residual acetyl group: 1 molar %; a polymerization degree: 2400), 40 parts of dipentaerythritol hexaacrylate, 0.1 parts of hydroquinone, 250 parts of cellosolve, 1 part of 2,4-diethylthioxanthone and 1 part of dimethylaminoacetophenone, a solution prepared by dissolving 0.4 parts of 2-acrylamide-2-methylpropanesulfonic acid in 10 parts of methanol was added and the mixture was charged in an attritor which was run for 10 hours to disperse each component.

According to the same manner as that described in Example 13, physical properties of the coating composition and the coating film formed from the coating composition according to the same manner as that described in Example 1 were measured. The results are shown in Table 2.

EXAMPLE 17

100 Parts of an antimony oxide-containing tin oxide powder having a particle size of 0.02 μm ("T-1", manufactured by Mitsubishi Material Co., Ltd.), 13 parts of an acetal resin (an acetoacetalization degree: 65 molar %; a residual hydroxyl group: 34 molar %; a residual acetyl group: 1 molar %; a polymerization degree: 2400), 5 parts of pentaerythritol triacrylate, 12 parts of pentaerythritol tetraacrylate, 15 parts of 2-acryloyloxyethyl-2-hydroxyethylphthalic acid ("HOA-MPE", manufactured by Kyoei Sha Chemical Co.), 0.1 parts of hydroquinone and 240 parts of cellosolve were charged in an attritor which was run for 10 hours to disperse each component.

Then, a solution prepared by dissolving 1 part of 2,4-diethylthioxanthone and 1 part of ethyl-p-dimethylaminobenzoate in 20 parts of cellosolve was added and the attritor was run for additional 15 minutes to give a photo-setting conductive coating composition.

According to the same manner as that described in Example 13, physical properties of the coating composition and the coating film formed from the coating composition according to the same manner as that described in Example 1 were measured. The results are shown in Table 2.

EXAMPLE 18

100 Parts of an antimony oxide-containing tin oxide powder having a particle size of 0.02 μm ("T-1", manufactured by Mitsubishi Material Co., Ltd.), 25 parts of an acetal resin (a butyralization degree: 40 molar %; an acetoacetalization degree: 27 molar %; a residual hydroxyl group: 32 molar %; a residual acetyl group: 1 molar %; a polymerization degree: 2000), 5 parts of pentaerythritol triacrylate, 20 parts of pentaerythritol tetraacrylate, 7 parts of mono(2-acryloyloxyethyl)acid phosphate, 0.1 parts of hydroquinone, 40 parts of methyl ethyl ketone and 240 parts of cellosolve were charged in an attritor which was run for 10 hours to disperse each component.

Then, a solution prepared by dissolving 1 part of 2,4-diethylthioxanthone and 1 part of ethyl-p-dimethylaminobenzoate in 20 parts of cellosolve was added and the attritor was run for additional 15 minutes to give a photo-setting conductive coating composition.

According to the same manner as that described in Example 13, physical properties of the coating composition and the coating film formed from the coating composition according to the same manner as that described in Example 1 were measured. The results are shown in Table 2.

Comparative Example 3

100 Parts of an antimony oxide-containing tin oxide powder having a particle size of 0.02 μm ("T-1", manufactured by Mitsubishi Material Co., Ltd.), 23 parts of a hydroxyethyl methacrylate/methyl methacrylate copolymer (weight ratio: 2:8), 9 parts of pentaerythritol triacrylate, 15 parts of pentaerythritol tetraacrylate, 7 parts of mono(2-acryloyloxyethyl)acid phosphate, 0.1 part of hydroquinone, 220 parts of methyl ethyl ketone and 190 parts of cellosolve were charged in an attritor which was run for 10 hours to disperse each component.

Then, a solution prepared by dissolving 1 part of benzophenone and 1 part of Michler's ketone in 50 parts of cellosolve was added and the attritor was run for additional 15 minutes to give a photo-setting conductive coating composition.

According to the same manner as that described in Example 13, physical properties of the coating composition and the coating film formed from the coating composition according to the same manner as that described in Example 1 were measured. The results are shown in Table 2.

in Example 1 were measured. The results are shown in Table 3.

EXAMPLE 21

100 Parts of an antimony oxide-containing tin oxide powder having a particle size of 0.02 μm ("T-1", manufactured by Mitsubishi Material Co., Ltd.), 10 parts of an acetal resin (a butyralization degree: 65 molar %; a residual hydroxyl group: 34 molar %; a residual acetyl group: 1 molar %; a polymerization degree: 1700), 8 parts of pentaerythritol triacrylate, 24 parts of pentaerythritol tetraacrylate, 0.1 part of hydroquinone, 1 part of benzophenone, 1 part of Michler's ketone, 25 parts of acetic acid, 40 parts of methyl ethyl ketone and 250

TABLE 2

| | | Example | | | | | | Comparative Example |
|---|---|---|---|---|---|---|---|---|
| | | 13 | 14 | 15 | 16 | 17 | 18 | 3 |
| Viscosity of coating composition | Immediately after preparation (centipoise) | 200 | 180 | 190 | 150 | 160 | 130 | 20 |
| | After storage for one month (centipoise) | 210 | 190 | 210 | 160 | 190 | 150 | 5000 or more |
| Appearance after coating | | Smooth | Smooth | Smooth | Smooth | Smooth | Smooth | Opaque |
| Physical propterties of coating composition | Surface intrinsic resistance ($10^6 \Omega/\square$) | 2 | 3 | 7 | 2 | 1 | 5 | 800 |
| | Total light transmittance (%) | 84 | 83 | 81 | 83 | 82 | 83 | 86 |
| | Haze (%) | 1.5 | 1.6 | 2.4 | 1.5 | 1.6 | 2.4 | 7.7 |
| | Pencil hardness | 5H | 4H | 5H | 5H | 5H | 5H | 4H |

Note)
Smooth: Coating film having the smooth surface
Opaque: Opaque coating film due to aggregation of tin oxide powder

EXAMPLE 19

100 Parts of an antimony oxide-containing tin oxide powder having a particle size of 0.02 μm ("T-1", manufactured by Mitsubishi Material Co., Ltd.), 9 parts of an acetal resin (a butyralization degree: 65 molar %; a residual hydroxyl group: 34 molar %; a residual acetyl group: 1 molar %; a polymerization degree: 1700), 33 parts of dipentaerythritol hexaacrylate, 0.1 part of hydroquinone, 1 part of thioxanthone, 1 part of dimethylaminoacetophenone, 0.5 parts of methanesulfonic acid and 260 parts of cellosolve were charged in an attritor which was run for 10 hours to disperse each component.

According to the same manner as that described in Example 13, physical properties of the coating composition and the coating film formed from the coating composition according to the same manner as that described in Example 1 were measured. The results are shown in Table 3.

EXAMPLE 20

100 Parts of an antimony oxide-containing tin oxide powder having a particle size of 0.02 μm ("T-1", manufactured by Mitsubishi Material Co., Ltd.), 13 parts of an acetal resin (a butyralization degree: 65 molar %; a residual hydroxyl group: 34 molar %; a residual acetyl group: 1 molar %; a polymerization degree: 1700), 6 parts of pentaerythritol triacrylate, 24 parts of pentaerythritol tetraacrylate, 0.1 part of hydroquinone, 1 part of benzophenone, 1 part of Michler's ketone, 20 parts of methacrylic acid, 50 parts of methyl ethyl ketone and 300 parts of cellosolve were charged in an attritor which was run for 10 hours to disperse each component.

According to the same manner as that described in Example 13, physical properties of the coating composition and the coating film formed from the coating composition according to the same manner as that described parts of cellosolve were charged in an attritor which was run for 10 hours to disperse each component.

According to the same manner as that described in Example 13, physical properties of the coating composition and the coating film formed from the coating composition according to the same manner as that described in Example 1 were measured. The results are shown in Table 3.

EXAMPLE 22

100 Parts of an antimony oxide-containing tin oxide powder having a particle size of 0.02 μm ("T-1", manufactured by Mitsubishi Material Co., Ltd.), 25 parts of an acetal resin (a butyralization degree: 38 molar %; an acetoacetalization degree: 29 molar %; a residual hydroxyl group: 32 molar %; a residual acetyl group: 1 molar %; a polymerization degree: 2400), 25 parts of dipentaerythritol hexaacrylate, 0.1 part of hydroquinone, 260 parts of cellosolve, 1 part of 2,4-diethylthioxanthone, 1 part of dimethylaminoacetophenone and 0.5 parts of methanesulfonic acid were charged in an attritor which was run for 10 hours to disperse each component.

According to the same manner as that described in Example 13, physical properties of the coating composition and the coating film formed from the coating composition according to the same manner as that described in Example 1 were measured. The results are shown in Table 3.

EXAMPLE 23

100 Parts of an antimony oxide-containing tin oxide powder having a particle size of 0.02 μm ("T-1", manufactured by Mitsubishi Material Co., Ltd.), 8 parts of an acetal resin (an acetoacetalization degree: 65 molar %; a residual hydroxyl group: 34 molar %; a residual acetyl group: 1 molar %; a polymerization degree: 2400), 10 parts of pentaerythritol triacrylate, 40 parts of pentaerythritol tetraacrylate, 15 parts of methacrylic acid, 0.1 part of hydroquinone and 350 parts of cellosolve were charged in an attritor which was run for 10 hours to disperse each component.

Then, a solution prepared by dissolving 1 part of thioxanthone and 1 part of Michler's ketone in 20 parts of cellosolve was added and the attritor was run for additional 15 minutes to give a photo-setting conductive coating composition.

According to the same manner as that described in Example 13, physical properties of the coating composition and the coating film formed from the coating composition according to the same manner as that described in Example 1 were measured. The results are shown in Table 3.

EXAMPLE 24

100 Parts of an antimony oxide-containing tin oxide powder having a particle size of 0.02 μm ("T-1", manufactured by Mitsubishi Material Co., Ltd.), 10 parts of an acetal resin (a butyralization degree: 40 molar %; an acetoacetalization degree: 27 molar %; a residual hydroxyl group: 32 molar %; a residual acetyl group: 1 molar %; a polymerization degree: 2000), 40 parts of oligoester acrylate ("Alonix M-9050", manufactured by Toagosei Chemical Industry Co., Ltd), 35 parts of acetic acid, 0.1 part of hydroquinone and 290 parts of cellosolve were charged in an attritor which was run for 10 hours to disperse each component.

Then, a solution prepared by dissolving 1 part of thioxanthone and 1 part of benzyl dimethyl ketal in 20 parts of cellosolve was added and the attritor was run for additional 15 minutes to give a photo-setting conductive coating composition.

According to the same manner as that described in Example 13, physical properties of the coating composition and the coating film formed from the coating composition according to the same manner as that described in Example 1 were measured. The results are shown in Table 3.

Comparative Example 4

100 Parts of an antimony oxide-containing tin oxide powder having a particle size of 0.02 μm ("T-1", manufactured by Mitsubishi Material Co., Ltd.), 13 parts of hydroxyethyl methacrylate/methyl methacrylate copolymer (weight ratio: 2:8), 29 parts of dipentaerythritol hexaacrylate, 0.1 part of hydroquinone, 1 part of benzophenone, 1 part of Michler's ketone, 20 parts of methacrylic acid and 260 parts of cellosolve were charged in an attritor which was run for 10 hours to disperse each component.

According to the same manner as that described in Example 13, physical properties of the coating composition and the coating film formed from the coating composition according to the same manner as that described in Example 1 were measured. The results are shown in Table 3.

TABLE 3

| | | Example | | | | | | Comparative Example |
|---|---|---|---|---|---|---|---|---|
| | | 19 | 20 | 21 | 22 | 23 | 24 | 4 |
| Viscosity of coating composition | Immediately after preparation (centipoise) | 210 | 200 | 180 | 200 | 170 | 180 | 20 |
| | After storage for one month (centipoise) | 210 | 210 | 190 | 210 | 170 | 180 | 8000 |
| Appearance after coating | | Smooth | Smooth | Smooth | Smooth | Smooth | Smooth | Opaque |
| Physical propterties of coating composition | Surface intrinsic resistance ($10^6 \Omega/\square$) | 3 | 1 | 2 | 3 | 2 | 2 | 6 |
| | Total light transmittance (%) | 83 | 81 | 83 | 86 | 82 | 83 | 86 |
| | Haze (%) | 1.3 | 3.2 | 2.0 | 1.4 | 2.8 | 1.4 | 7.7 |
| | Pencil hardness | 5H | 5H | 5H | 5H | 5H | 5H | 4H |

Note)
Smooth: Coating film having the smooth surface
Opaque: Opaque coating film due to aggregation of tin oxide ponder

Example 25

To a solution prepared by dissolving 8 parts of an acetal resin (an acetoacetalization degree: 65 molar %; a residual hydroxyl group: 34 molar %; a residual acetyl group: 1 molar %; a polymerization degree: 2400) in 4 parts of cyclohexanone, 4 parts of methacryloyl isocyanate was added, and the reaction was conducted for one hour with stirring to give a dispersant solution. The molar % of the methacryloyl group was 24 molar % and that of the residual hydroxyl group was 10 molar %.

The above dispersant solution, 100 parts of an antimony oxide-containing tin oxide powder having a particle size of 0.02 μm ("T-1", manufactured by Mitsubishi Material Co., Ltd.), 33 parts of dipentaerythritol hexaacrylate, 0.1 part of hydroquinone, 1 part of thioxanthone and 0.5 parts of methanesulfonic acid were charged in an attritor which was run for 10 hours to disperse each component.

According to the same manner as that described in Example 13 except that haze of the coating film obtained from the coating composition after storage for one month was measured in place of evaluation of the appearance after coating, physical properties of the coating composition and the coating film formed from the coating composition according to the same manner as that described in Example 1 were measured. The results are shown in Table 4.

EXAMPLE 26

To a solution prepared by dissolving 9 parts of an acetal resin (a butyralization degree: 65 molar %; a residual hydroxyl group: 34 molar %; a residual acetyl group: 1 molar %; a polymerization degree: 1700) in 300 parts of methyl ethyl ketone, 3 parts of methacryloyl isocyanate was added, and the reaction was conducted for one hour with stirring to give a dispersant solution. The molar % of the methacryloyl group was 21 molar % and that of the residual hydroxyl group was 13 molar %.

The above dispersant solution, 100 parts of an antimony oxide-containing tin oxide powder having a particle size of 0.02 μm ("T-1", manufactured by Mitsubishi Material Co., Ltd.), 31 parts of pentaerythritol tetraacrylate, 0.1 part of hydroquinone, 1 part of 2,4-dietylthioxanthone, 1 part of dimethylaminoacetophenone and 20 parts of methacrylic acid were charged in an attritor which was run for 10 hours to disperse each component.

According to the same manner as that described in Example 13, physical properties of the coating composition and the coating film formed from the coating composition according to the same manner as that described in Example 1 were measured. The results are shown in Table 4.

EXAMPLE 27

To a solution prepared by dissolving 8 parts of an acetal resin (an acetoacetalization degree: 65 molar %; a residual hydroxyl group: 34 molar %; a residual acetyl group: 1 molar %; a polymerization degree: 2400) in 4 parts of cyclohexanone, 4 parts of methacryloyl isocyanate was added, and the reaction was conducted for one hour with stirring to give a dispersant solution. The molar % of the methacryloyl group was 24 molar % and that of the residual hydroxyl group was 10 molar %.

The above dispersant solution, 100 parts of an antimony oxide-containing tin oxide powder having a particle size of 0.02 μm ("T-1", manufactured by Mitsubishi Material Co., Ltd.), 33 parts of dipentaerythritol hexaacrylate, 0.1 part of hydroquinone, 1 part of thioxanthone, 1 part of ethyl-p-dimethylaminobenzoate and 0.5 parts of 2-methacrylamide-2-methylpropanesulfonic acid were charged in an attritor which was run for 10 hours to disperse each component.

According to the same manner as that described in Example 13, physical properties of the coating composition and the coating film formed from the coating composition according to the same manner as that described in Example 1 were measured. The results are shown in Table 4.

crylate, 0.1 part of hydroquinone, 1 part of 2,4-diethylthioxanthone, 1 part of dimethylaminoacetophenone and 5 parts of mono(2-methacryloylethyl)acid phosphate (i.e. methacrylic acid-2-ethyl phosphate) were charged in an attritor which was run for 10 hours to disperse each component.

According to the same manner as that described in Example 13, physical properties of the coating composition and the coating film formed from the coating composition according to the same manner as that described in Example 1 were measured. The results are shown in Table 4.

Comparative Example 5

According to the same manner as that described in Example 26 except for adding no methacrylic acid, a photo-setting conductive coating composition was prepared.

According to the same manner as that described in Example 13, physical properties of the coating composition and the coating film formed from the coating composition according to the same manner as that described in Example 1 were measured. The results are shown in Table 4.

Comparative Example 6

According to the same manner as that described in Example 27 except for adding no 2-methacrylamide-2-methylpropanesulfonic acid, a photo-setting conductive coating composition was prepared.

According to the same manner as that described in Example 13, physical properties of the coating composition and the coating film formed from the coating composition according to the same manner as that described in Example 1 were measured. The results are shown in Table 4.

TABLE 4

|  |  | Example | | | | Comparative Example | |
|---|---|---|---|---|---|---|---|
|  |  | 25 | 26 | 27 | 28 | 5 | 6 |
| Viscosity of coating composition | Immediately after preparation (centipoise) | 180 | 200 | 180 | 150 | 180 | 200 |
|  | After storage for one month (centipoise) | 200 | 210 | 200 | 170 | 8000 | 9500 |
| Physical properties of coating composition | Surface intrinsic resistance ($10^6 \Omega/\square$) | 3 | 1 | 4 | 3 | 6 | 3 |
|  | Total light transmittance (%) | 81 | 81 | 81 | 82 | 82 | 81 |
|  | Haze (%) Immediately after preparation | 1.3 | 1.0 | 0.8 | 1.3 | 1.7 | 1.1 |
|  | After storage for one month | 1.3 | 1.2 | 1.0 | 1.5 | Gelation | Gelation |
|  | Pencil hardness | 5H | 5H | 5H | 5H | 5H | 5H |

Note) Gelation: Coating can not be conducted due to gelation.

Table 4.

EXAMPLE 28

To a solution prepared by dissolving 9 parts of an acetal resin (a bytyralization degree: 65 molar %; a residual hydroxyl group: 34 molar %; a residual acetyl group: 1 molar %; a polymerization degree: 1700) in 300 parts of methyl ethyl ketone, 3 parts of methacryloyl isocyanate was added, and the reaction was conducted for one hour with stirring to give a dispersant solution. The molar% of the methacryloyl group was 21 molar % and that of the residual hydroxyl group was 13 molar %.

The above dispersant solution, 100 parts of an antimony oxide-containing tin oxide powder having a particle size of 0.02 μm ("T-1", manufactured by Mitsubishi Material Co., Ltd.), 31 parts of pentaerythritol tetraa-

INDUSTRIAL APPLICABILITY

The photo-setting conductive coating composition of the present invention can be used as antistatic material for storage vessels for semi-conductor wafers, electronic/electric parts, floor/wall covering for a production factory of semi-conductors etc., wherein static electrification must be avoided.

The photo-setting conductive coating composition of the present invention can be easily coated by a normal coating method, and can be easily set by ultraviolet or visible radiation to form a coating film superior in antistatic properties, transparency, hardness and marring resistance.

We claim:

1. A photo-setting conductive coating composition comprising 100 parts by weight of an antimony oxide-containing tin oxide powder (a) having a particle size of 0.01 to 0.4 μm, 10 to 100 parts by weight of a (meth)acrylate compound (b) having at least two (meth)acryloyl groups in a molecule, 10 to 100 parts by weight of an acetal resin (c) having a residual hydroxyl group of 20 to 80 molar %, 0.1 to 10 parts by weight of a photopolymerization initiator (d) and 100 to 1000 parts by weight of an organic solvent (e).

2. A photo-setting conductive coating composition comprising 100 parts by weight of an antimony oxide-containing tin oxide powder (a) having a particle size of 0.01 to 0.4 μm, 10 to 100 parts by weight of a (meth)acrylate compound (b) having at least two (meth)acryloyl groups in a molecule, 5 to 50 parts by weight of an acetal resin (c) having a residual hydroxyl group of 20 to 80 molar %, 0.1 to 10 parts by weight of a photopolymerization initiator (d), 100 to 1000 parts by weight of an organic solvent (e) and 0.1 to 50 parts by weight of an organic acid (f) selected from the group consisting of an aliphatic saturated monocarboxylic acid, a sulfonic acid derivative and an acid having a (meth)acryloyl group in a molecule.

3. A photo-setting conductive coating composition comprising 100 parts by weight of an antimony oxide-containing tin oxide powder (a) having a particle size of 0.01 to 0.4 μm, 10 to 100 parts by weight of a (meth)acrylate compound (b) having at least two (meth)acryloyl groups in a molecule, 0.1 to 10 parts by weight of a photopolymerization initiator (d), 100 to 1000 parts by weight of an organic solvent (e), 0.1 to 50 parts by weight of at least one sort of an organic acid (f) selected from the group consisting of an aliphatic saturated monocarboxylic acid, a sulfonic acid derivative and an acid having a (meth)acryloyl group in a molecule and 5 to 50 parts by weight of an acetal resin (g) having a (meth)acryloyl group at a side chain.

4. The composition according to any one of claims 1 to 3, wherein an amount of an antimony oxide in the antimony oxide-containing tin oxide powder is 0.1 to 20% by weight.

5. The composition according to any one of claims 1 to 3, wherein the (meth)acrylate compound (b) is selected from the group consisting of ethylene glycol di(meth)acrylate, diethylene glycol di(meth)acrylate, triethylene glycol di(meth)acrylate, tetraethylene glycol di(meth)acrylate, nonaethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, 2,2-bis[4-(acryloxydiethoxy)phenyl]propane, 2,2-bis[4-(methacryloxydiethoxy)phenyl]propane, 1,6-bis(3-acryloxy-2-hydroxypropyl)hexyl ether, pentaerythritol tri(meth)acrylate, trimethylolpropane tri(meth)acrylate, glycerol tri(meth)acrylate, tris(2-hydroxyethyl) isocyanurate (meth)acrylate, pentaerythritol tetra(meth)acrylate, pentaerythritol penta(meth)acrylate, dipentaerythritol penta(meth)acrylate, dipentaerythritol hexa(meth)acrylate and oligoester acrylate (polyester acrylate having about 5 to 6 acryloyl groups).

6. The composition according to any one of claims 1 to 3, wherein the (meth)acrylate compound (b) is prepared by reacting a compound having at least two isocyanate groups in a molecule with (meth)acrylate having an active hydrogen and is an acrylic urethane oligomer having at least two (meth)acryloyl groups at a molecular terminal and an urethane bond in a molecule.

7. The composition according to claim 6, wherein the compound having at least two isocyanate groups is selected from the group consisting of m-phenylene diisocyanate, p-phenylene diisocyanate, toluene-2,4-diisocyanate, toluene-2,5-diisocyanate, toluene-2,6-diisocyanate, toluene-3,5-diisocyanate, m-xylylene diisocyanate, p-xylylene diisocyanate, hexamethylene diisocyanate, trimethylhexamethylene diisocyanate, isophorone diisocyanate, 4,4'-diphenylmethane diisocyanate, 4,4'- diisocyanate-3,3'-dimethylbiphenyl and 4,4'-diisocyanate-3,3'-dimethylbiphenylmethane.

8. The composition according to claim 6, wherein the (meth)acrylate having an active hydrogen is selected from the group consisting of 2-hydroxyethyl (meth)acrylate, 2-hydroxypropyl (meth)acrylate, 3-hydroxypropyl (meth)acrylate, glycerin di(meth)acrylate, 1,6-bis(3-acryloxy-2-hydroxypropyl)hexyl ether, pentaerythritol tri(meth)acrylate, tris-(2-hydroxyethyl)isocyanurate (meth)acrylate and (meth)acrylic acid.

9. The composition according to claim 1 or 2, wherein the acetal resin (c) is prepared by acetalization of polyvinyl alcohol, or saponification and acetalization of polyvinyl acetate, using aldehyde selected from the group consisting of formaldehyde, acetaldehyde, propionaldehyde, butyraldehyde, amylaldehyde, hexylaldehyde, heptylaldehyde, octylaldehyde, 2-ethylhexylaldehyde, decylaldehyde and cyclohexylaldehyde.

10. The composition according to any one of claims 1 to 3, wherein the photopolymerization initiator (d) is selected from the group consisting of sodium methyldithiocarbamate sulfide, tetramethylthiuram monosulfide, diphenyl monosulfide, dibenzothiazoyl monosulfide, disulfide, thioxanthone, 2-ethylthioxanthone, 2-chlorothioxanthone, 2,4-diethylthioxanthone, hydrazone, azobisisobutyronitrile, benzenediazonium, benzoin, benzoin methyl ether, benzoin ethyl ether, benzophenone, dimethylaminobenzophenone, dimethylaminoacetophenone, Michler's ketone, benzylanthraquinone, t-butylanthraquinone, 2-methylanthraquinone, 2-ethylanthraquinone, 2-aminoanthraquinone, 2-chloroanthraquinone, benzyl dimethyl ketal, methylphenyl glyoxylate, methyl-p-dimethylaminobenzoate, ethyl-p-dimethylaminobenzoate, butyl-p-dimethylaminobenzoate, isopropyl-p-diethylaminobenzoate, benzoyl peroxide, di-t-butyl peroxide, dicumyl peroxide, cumene hydroperoxide, 9-phenylacridine, 9-p-methoxyphenylacridine, 9-acetylaminoacridine, benzacridine, 9,10-dimethylbenzphenazine, 9-methylbenzphenazine, 10-methoxybenzphenazine, 6,4',4''-trimethoxy-2,3-diphenylquinoxaline, 2,4,5-triphenylimidazoyl dimer, 2-nitrofluorene, 2,4,6-triphenylpyrylium tetrafluoroborate, 2,4,6-tris(trichloromethyl)-1,3,5-triazine, 3,3'-carbonylbiscumarin and Michler's thioketone.

11. The composition according to any one of claims 1 to 3, wherein the organic solvent (e) is selected from the group consisting of cyclohexane, ethylene glycol monomethyl ether (methyl cellosolve), ethylene glycol monoethyl ether (cellosolve), diethylene glycol dimethyl ether, butyl acetate, isopropyl acetone, methyl ethyl ketone and anisole.

12. The composition according to claim 2 or 3, wherein the organic acid (f) is an aliphatic monocarboxylic acid selected from the group consisting of acetic acid, propionic acid and butyric acid.

13. The composition according to claim 2 or 3, wherein the organic acid (f) is a sulfonic acid derivative selected from the group consisting of methanesulfonic acid, ethanesulfonic acid, p-styrenesulfonic acid and 2-(meth)acrylamide-2-methylpropanesulfonic acid.

14. The composition according to claim 2 or 3, wherein the organic acid (f) is selected from the group consisting of (meth)acrylic acid, 2-(meth)acryloyloxyethylsuccinic acid, 2-(meth)acryloyloxyethylphthalic acid, 2-(meth)acryloyloxyethyl-2-hydroxyethylsuccinic acid, 2-(meth)acryloyloxyethyl-2-hydroxyethylphthalic acid, mono [2-(meth)acryloyloxyethyl]acid phosphate, bis [2-(meth)acryloyloxyethyl]acid phosphate and mono [2-(meth)acryloyloxypropyl]acid phosphate.

15. The composition according to claim 3, wherein the acetal resin (g) is obtained by reacting a hydroxyl group of the acetal resin (c) with an isocyanate compound having a (meth)acryloyl group.

16. The composition according to claim 15, wherein the acetal resin (g) has a residual hydroxyl group of 2 to 60 molar %.

17. The composition according to claim 15, wherein the acetal resin (g) has a (meth)acryloyl group of 5 to 80 molar %.

18. An antistatic molded article comprising a coating film of the composition claimed in any one of claims 1 to 3 formed on the surface thereof.

19. The antistatic molded article according to claim 18, wherein the molded article is a synthetic resin film, sheet, a cabinet or glass plate.

* * * * *